US007122248B2

(12) United States Patent
Tam et al.

(10) Patent No.: US 7,122,248 B2
(45) Date of Patent: Oct. 17, 2006

(54) SECURITY ARTICLES

(75) Inventors: Thomas Y-T. Tam, Richmond, VA (US); Alfred Siggel, Hanover (DE); Samir Z. Abdalla, Midlothian, VA (US); Jiunn-Yow Chen, Chester, VA (US); Thomas Potrawa, Seelze (DE); Huy X. Nguyen, Midlothian, VA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/790,041

(22) Filed: Feb. 21, 2001

(65) Prior Publication Data

US 2002/0160188 A1 Oct. 31, 2002

(51) Int. Cl.
*B32B 1/10* (2006.01)
*B32B 5/16* (2006.01)

(52) U.S. Cl. ...................... 428/397; 428/373; 428/374; 428/399; 428/401; 428/402; 428/690; 428/913

(58) Field of Classification Search ................ 428/374, 428/373, 395, 397, 375, 195.1, 399, 690, 428/292.1, 509, 512, 523, 401, 400, 913; 283/901, 903, 904; 524/94
See application file for complete search history.

(56) References Cited

U.S. PATENT DOCUMENTS 3,366,575 A * 1/1968 Ono et al. ............. 252/301.24
3,449,257 A * 6/1969 Miller et al. ........... 252/301.28
3,650,752 A * 3/1972 Amano et al. .............. 430/139
3,668,189 A 6/1972 Goetz ....................... 260/78 R
3,900,676 A 8/1975 Alderson
4,183,989 A 1/1980 Tooth ......................... 428/195
4,552,603 A 11/1985 Harris, Jr. et al. .......... 156/167
4,601,949 A * 7/1986 Bach et al. ................. 428/374
4,655,788 A 4/1987 Jalon ............................ 8/648
4,756,557 A 7/1988 Kaule et al.
4,770,938 A * 9/1988 Peterson et al. ............ 428/398
4,781,647 A 11/1988 Doane, Jr. .................. 446/219
4,833,311 A * 5/1989 Jalon .......................... 235/491
4,897,300 A 1/1990 Boehm ....................... 428/195
4,921,280 A * 5/1990 Jalon ........................... 283/88
5,057,368 A * 10/1991 Largman et al. ............ 428/397
5,223,330 A 6/1993 Vockel, Jr. et al. ......... 428/204
5,292,855 A 3/1994 Krutak et al. ............... 528/289
5,321,069 A 6/1994 Owens ....................... 524/420
5,388,862 A * 2/1995 Edwards ...................... 283/82
5,407,535 A * 4/1995 Hansell ...................... 162/134

(Continued)

FOREIGN PATENT DOCUMENTS

CN 1092119 9/1994

(Continued)

OTHER PUBLICATIONS

U.K. Res. Disc. (1998), 411 Jul.), P. 871-872.

(Continued)

*Primary Examiner*—Rena Dye
*Assistant Examiner*—Camie S Thompson
(74) *Attorney, Agent, or Firm*—Deborah M. Chess

(57) ABSTRACT

This invention provides security articles comprising fibers, threads and fiber sections ("dots") possessing multiple verification characteristics. The fibers possess unique and difficulty duplicated combinations of complex cross-sections, components, and multiple luminescent responses. The many verifiable characteristics of the security fibers, threads and dots provide high levels of protection against fraudulent duplication of articles in which they are incorporated. The manifold security features provide means of tailoring specific identity characteristics for specific use and users.

38 Claims, 8 Drawing Sheets

U.S. PATENT DOCUMENTS

| | | | | |
|---|---|---|---|---|
| 5,424,006 | A | 6/1995 | Murayama et al. | 252/301.4 R |
| 5,461,136 | A | 10/1995 | Krutak et al. | 528/289 |
| 5,674,437 | A | 10/1997 | Geisel | 264/21 |
| 5,876,068 | A | 3/1999 | Schneider et al. | 283/86 |
| 5,914,076 | A | 6/1999 | Schloss | 264/21 |
| 5,990,197 | A | 11/1999 | Escano et al. | 523/160 |
| 6,045,656 | A | 4/2000 | Foster et al. | 162/140 |
| 6,066,687 | A * | 5/2000 | Capone et al. | 524/94 |
| 6,068,895 | A | 5/2000 | Kimura | 428/29 |
| 6,099,930 | A | 8/2000 | Cyr et al. | 428/64.1 |
| 6,138,913 | A | 10/2000 | Cyr et al. | 235/468 |
| 6,158,204 | A | 12/2000 | Talley et al. | 57/208 |
| 6,162,539 | A * | 12/2000 | Shimizu et al. | 428/373 |
| 6,312,822 | B1 * | 11/2001 | Irick et al. | 428/479.6 |
| 6,492,032 | B1 | 12/2002 | Irick, Jr. et al. | |
| 6,592,716 | B1 * | 7/2003 | Kim et al. | 162/140 |
| 2003/0035951 | A1 * | 2/2003 | Magill et al. | 428/373 |
| 2003/0122107 | A1 * | 7/2003 | Pourdeyhimi et al. | 252/301.36 |
| 2003/0194578 | A1 * | 10/2003 | Tam et al. | 428/690 |
| 2003/0198809 | A1 * | 10/2003 | Kang et al. | 428/375 |
| 2004/0209052 | A1 * | 10/2004 | Tam et al. | 428/195.1 |

FOREIGN PATENT DOCUMENTS

| | | |
|---|---|---|
| DE | 677 711 C | 7/1939 |
| DE | 1446851 | 11/1968 |
| EP | 066 854 B1 | 4/1985 |
| GB | 1569283 | 6/1980 |
| JP | 7300722 | 11/1995 |
| JP | 08226032 | 9/1996 |
| JP | 09111531 | 4/1997 |
| JP | 11003054 | 1/1999 |
| JP | 11081012 | 3/1999 |
| JP | 2000096349 | 4/2000 |
| KR | 9611906 | 9/1996 |
| WO | WO 9937836 | 7/1999 |
| WO | 9945200 | 9/1999 |

OTHER PUBLICATIONS

U.K. Res. Disc. (1998). 411 Jul.), P. 877-878.

* cited by examiner

Typical excitation (left) and fluorescence spectra (right)

Typical excitation (left) and fluorescence spectra (right)

Typical excitation (left) and fluorescence spectra (right)

Typical excitation (right) and fluorescence spectra (left)

SECURITY ARTICLES

BACKGROUND OF THE INVENTION

1. Field of the Invention

This invention relates to novel security articles comprising fibers, threads and fiber sections ("dots") possessing multiple verification characteristics. The fibers possess unique and difficulty duplicated combinations of complex cross-sections, components, and multiple luminescent responses. The many verifiable characteristics of the security fibers, threads, and dots provide high levels of protection against fraudulent duplication of articles in which they are incorporated. The manifold security features provide means of tailoring specific identity characteristics for specific use and users.

2. Description of the Related Art

Security fibers are fibers incorporated in fiduciary documents or other articles for the purpose of ensuring identification, authentication, and protection against forgery, imitation or falsification. The term "security thread" has been employed to describe twisted or braided fibers or strips of films for the same purposes.

German Patent 19802588 describes cellulose fibers containing luminescent additives for security purposes.

European Patent 066854 B1 describes cellulose acetate security fibers and security papers containing the fibers. The security fibers are spun from an acetone solution containing a lanthanide chelate. The fibers are colorless under normal lighting but show narrow-band emission in the visible or infra-red (IR) when excited by ultraviolet (UV) light. A security thread twined of fibers having different luminophors is described wherein coded information is impressed on the security thread.

U.S. Pat. Nos. 4,655,788 and 4,921,280 describe security fibers invisible in sunlight or artificial light, which under excitation by IR, UV or x-rays, exhibit a luminescence. The security fibers are prepared by a process of dyeing conventional textile fibers such as polyester, polyamide and cellulosic fibers with rare earth chelates.

German Patent DE-A 14 46 851 describes a security thread having a microprint executed in several colors.

U.S. Pat. No. 4,897,300 describes a security thread having luminescent colors that are invisible in normal lighting and are provided along the security thread in successive and overlapping portions which, when the colors are excited, have a length recognizable to the naked eye and in the overlapping areas have characteristic mixed luminescences. The security threads are produced by printing strip shapes on flat sheets and then cutting them up.

U.S. Pat. No. 6,068,895 describes a woven security label incorporating a detectable filament made by adding about 20 weight percent (wt. %) of an inorganic fluorescent substance to polyester dope and spinning filaments out of the dope.

U.S. Pat. No. 4,183,989 describes a security paper having at least two machine verifiable security features, one of which is a magnetic material, and a second of which may be a luminescent material. The luminescent material is dispersed in a lacquer and coated onto a film. The film is divided into planchettes of approximately 1 mm diameter and incorporated in the paper.

Korean Patent KR 9611906 and WO 9945200 describe methods of preparing luminescent fibers by dyeing. Korean Patent KR 9611906 describes the incorporation of the fibers into paper material.

UK Res. Discl. (1998), 411 (July), P. 877–P. 878, discloses bi-component fibers with differentially dyeable domains for incorporation into security papers.

Chinese Patent No. CN 1092119 describes polyvinyl alcohol fibers of 1–10 mm length containing pigments, dyes and fluorescent materials.

U.S. Pat. Nos. 5,876,068, 5,990,197, 5,990,930 and 6,099,930 describe yet other means of providing security elements involving luminescent substances.

In a related area, British Patent 1,569,283 describes an apparatus for verifying the authenticity of documents coded with fluorescent substances.

Each of these patents represented improvements in the state of their respective arts. However, as security technology has evolved, parallel improvements have taken place in the capabilities of those who would evade security measures. A need exists for security fibers possessing unique and more difficulty duplicated combinations of verifiable security characteristics. A further need exists for means to tailor specific identity characteristics for specific users.

Luminescent substances have also been incorporated into fibers for purposes unrelated to security applications or for unspecified purposes.

U.S. Pat. No. 4,781,647 describes a method of producing phosphorescent filaments by mixing phosphors, preferably zinc, cadmium or calcium sulfide into the polymer together with a coupling agent prior to extrusion and spinning into fibers for dolls' hair.

U.S. Pat. No. 5,321,069 describes a process for producing phosphorescent bulked continuous filament (BCF) yarns of thermoplastic polymers for textile applications by melt spinning. The process comprises the steps of mixing the polymer pellets with a wetting agent, preferably mineral oil, adding a phosphorescent powder such as zinc sulfide to substantially uniformly coat the pellets, and heating in an extruder to form and extrude a melt whereby a uniform distribution of phosphorescent pigment is said to be obtained throughout the filaments. The individual filaments may be solid or hollow and may have any conventional shape.

U.S. Pat. No. 5,674,437 describes a method for preparing luminescent fibers comprising the steps of combining in an extruder a thermoplastic polymer with a luminescent metal aluminate pigment, heating and mixing to melt the polymer, and extruding the melt to form a fiber.

U.S. Pat. No. 3,668,189 describes fiber forming fluorescent polycarbonamides prepared by co-polymerization of a fused ring polynuclear aromatic hydrocarbon moiety having at least three fused rings.

Japanese Patents 7300722 A2 and 2000096349 A2 describe sheath-core fibers with the core containing the luminescent substance.

SUMMARY OF THE INVENTION

The invention provides security articles comprising security fibers, threads and dots for security applications possessing unique and difficulty duplicated multiple verification characteristics including combinations of complex cross-sections, components and multiple luminescent responses. The multiple security features provide means of tailoring specific identity characteristics for specific users.

A security fiber of the invention is comprised of at least one synthetic polymer filament possessing multiple security elements comprising: a filament cross-section having a complexity factor of at least 5, and at least one component containing at least one luminescent substance, wherein the luminescent substance exhibits at least two luminescent spectral response peaks when excited by at least one wavelength selected from the region 200 to 2000 nanometers.

The security dots are prepared by transversely sectioning the filaments of the security fibers.

DETAILED DESCRIPTION OF THE INVENTION

The present invention provides security fibers, threads and dots possessing combinations of complex cross-sectional shapes, components and multiple luminescent responses that are unique and difficulty duplicated. The security fibers of the invention are single filaments (monofilaments) or assemblies of monofilaments. Where fiber cross-section is discussed below, it will be understood that reference is made to the monofilament cross-section unless otherwise stated. The fibers, threads and dots of the invention are inserted into papers, documents and other articles by appropriate processes to provide enhance levels of security.

The security fibers of the invention are formed from synthetic polymers by continuous processes, such as melt spinning, wet spinning, dry spinning, gel spinning and others. Synthetic fibers typically are conventionally spun with round cross-sections, but triangular, rectangular, trilobal, quadrilobal, and other shapes are known. Fiber cross-sections may also be multiply connected, i.e., they may contain holes, preferably cylindrical, which extend through the entire length of the fiber. The greater is the degree of complexity of a fiber cross-section, the greater is the difficulty of the design of a spinneret to produce same, and the greater is the degree of difficulty to duplicate this design by a fraudulent party.

For the purposes of this invention, the "complexity factor" of a fiber cross-section is quantitatively defined as follows:

$$CF = (L + N + C^3)\left[2\frac{H}{L} + 1\right]^{\left(\frac{R+2}{2}\right)}$$

where: CF is the "complexity factor" of the fiber cross-section;

- L is the number of lobes or projections of the cross-section;
- N is the number of nodes or branch points;
- C is the number of components of the fiber;
- H is the number of holes in the cross-section; and
- R is the number of reversals of curvature upon traversing in one direction once around the inner surface of a hole in the fiber cross-section.
- A reversal of curvature is signaled by a change in the position of the center of curvature from one side to the other side of the tangent to the inner surface of the hole in the fiber cross-section.

For example, a conventional solid round fiber cross-section is perfectly symmetrical having no lobes (L=0), no nodes or branch points (N=0), one component (C=1), no holes (H=0), and therefore no reversals of surface curvature within a hole (R=0). Consequently, this simple fiber has a complexity factor as defined above equal to $(0+0+1^3)\times[1]^1=1$.

Figure 1:
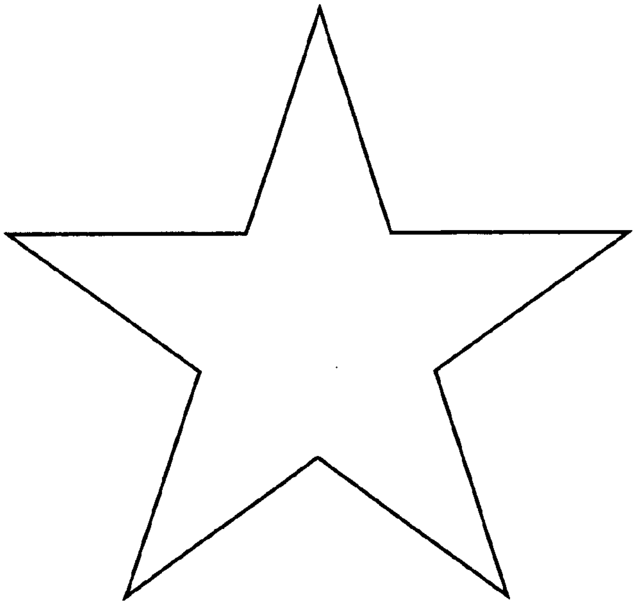
FIG. 1 shows a fiber cross-section having a five-pointed star shape.

The fiber cross-section shown in FIG. 1 has five lobes (L=5), one node at its center (N=1), one component (C=1), no holes, and therefore no reversals of surface curvature within a hole (R=0). Therefore this fiber has a complexity factor equal to $(5+1+1^3)\times[1]^1=7\times1=7$.

Figure 2A:
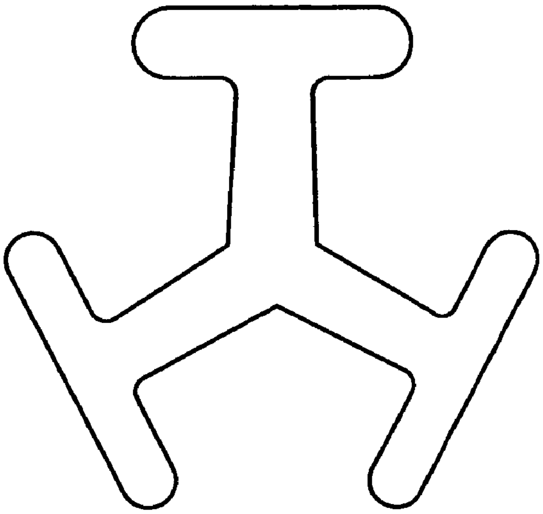
FIG. 2A Prior Art
FIGS. 2A and 2B show the cross-sections of a trilobal and a quadrilobal fiber, respectively, each having T-shaped lobes, as described in U.S. Pat. No. 5,057,368.
Figure 2B:
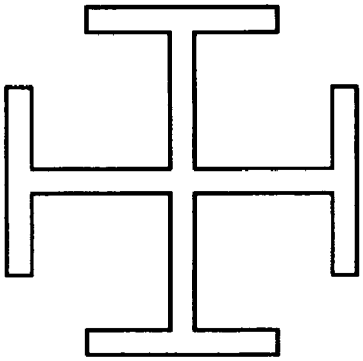
FIG. 2B Prior Art

The quadrilobal fiber shown in FIG. 2B has four lobes (L=4), one node at its center and one on each lobe (N=5), one component (C=1), no holes (H=0) and no reversals of curvature (R=0) within a hole. Therefore the complexity factor of this fiber is $(4+5+1^3)\times[1]^1=10\times1=10$.

Figure 3:
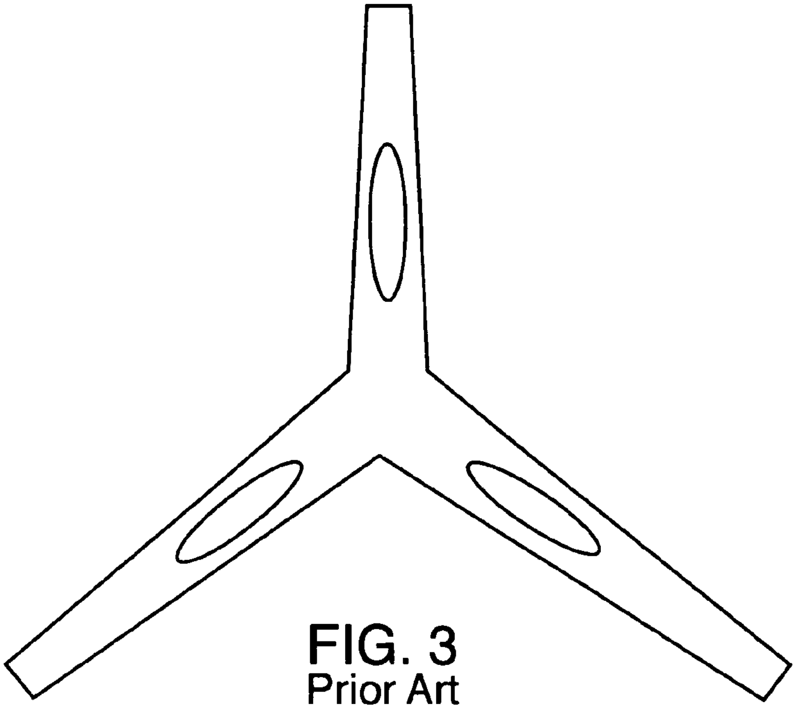
FIG. 3 Prior Art
FIG. 3 shows the cross-section of a trilobal fiber previously described in U.S. Pat. No. 4,770,938 having an axially extending (cylindrical) hole in each lobe.

The trilobal fiber shown in FIG. 3 has three lobes (L=3), one node at the center (N=1), one component (C=1), three holes (H=3), and no reversals of curvature within a hole (R=0). The complexity factor of this fiber is $(3+1+1^3)\times[3]^1=5\times3=15$.

Figure 4:
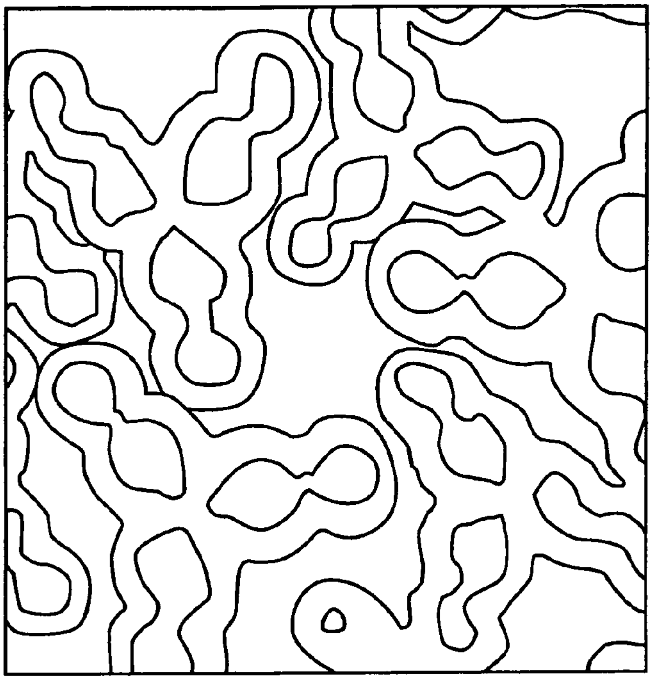
FIG. 4 shows the cross-section of a trilobal fiber having hollow lobes in the shape of a figure eight.

The fiber shown in FIG. 4 has a cross-section having three figure eight shaped hollow lobes. The number of lobes is three (L=3). There is a branch point at the center (N=1). There is one component (C=1). There are three holes in the cross-section (H=3). Traversing in one direction around the inner surface of a hole, the center of curvature reverses twice upon traversing the waist on each side of the lobe, making four reversals of curvature in all (R=4). Therefore the complexity factor of the fiber of FIG. 4 is $(3+1+1^3)\times[2+1]^3=5\times27=135$.

Figure 5:
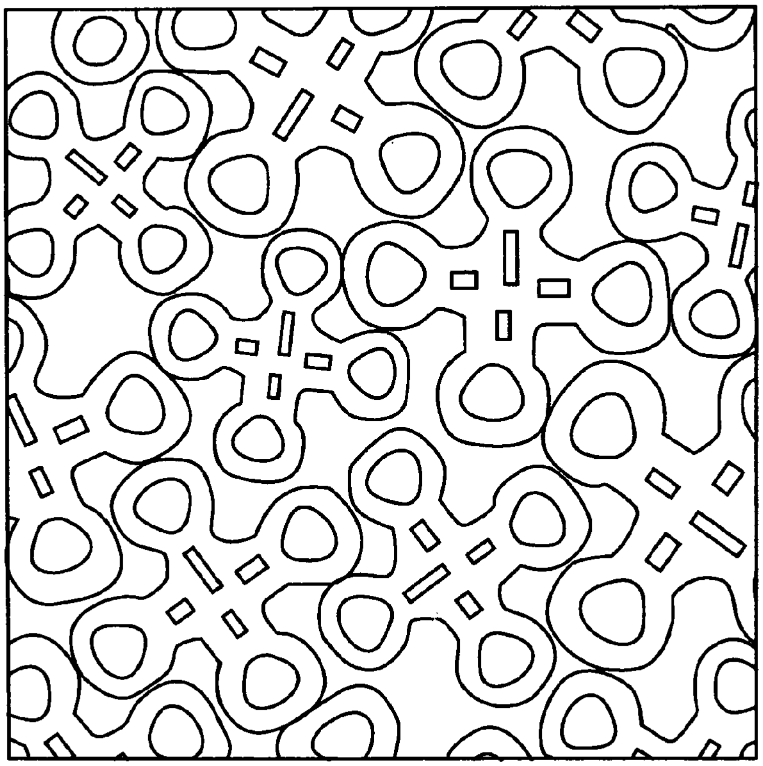
FIG. 5 shows the cross-section of a quadrilobal fiber having semicircular cylindrical holes at the distal ends of each lobe and elliptically shaped cylindrical holes in each lobe.
Figure 6:
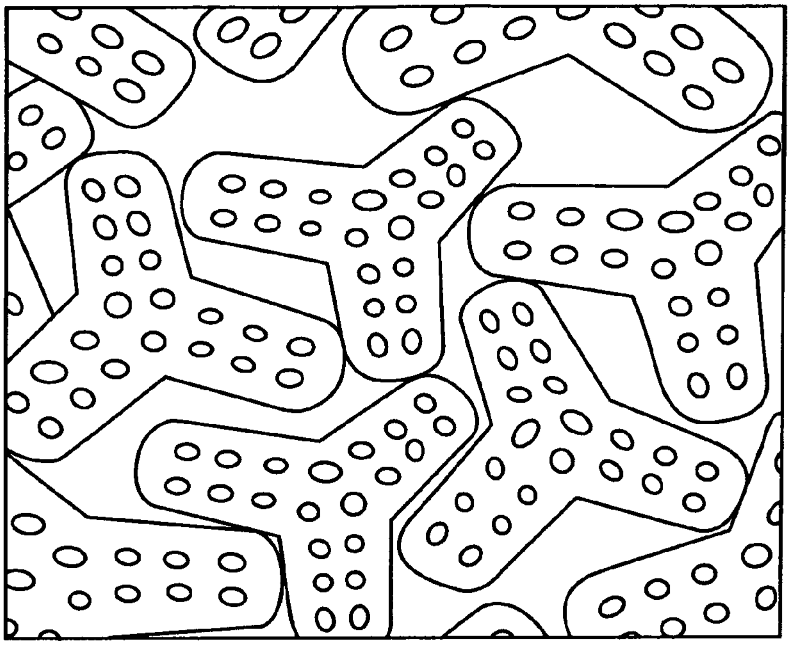
FIG. 6 shows the cross-section of a trilobal fiber having three double rows of cylindrical holes in each lobe and a trio of cylindrical holes at the center of the cross-section.

Similarly, the fiber cross-sections illustrated in FIGS. 5 and 6 have complexity factors of 30 and 70 respectively.

Figure 7:
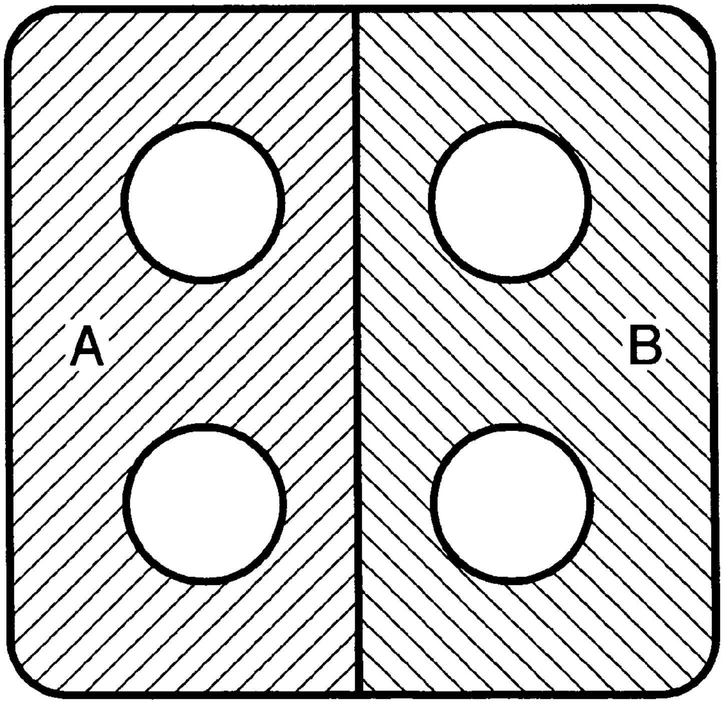
FIG. 7 Prior Art
FIG. 7 shows the cross-section of a bi-component quadrilobal fiber having four cylindrical holes (see U.S. Pat. No. 6,158,204)

As a final illustration, the bi-component fiber shown in FIG. 7 has four lobes (L=4), one node at the center (N=1), two components (C=2), four holes (H=4) and no reversals of curvature within a hole (R=0). Therefore the complexity factor of the fiber of FIG. 7 is $(4+1+2^3)\times[2+1]^1=13\times3=39$.

It will be understood that the fibers of the invention generally have a constant cross-section along their lengths.

One of the verifiable features of the security elements of this invention is the fiber cross-section. The complexity factor of the cross-section (as defined above) is preferably at least 5, more preferably at least 10, yet more preferably at least 15, more preferably at least 20 and most preferably at least 25. U.S. Pat. Nos. 5,057,368 and 4,770,938 describe how to spin fibers having the complex cross-sections shown in FIGS. 2 and 3 respectively and are hereby incorporated by reference to the extent not incompatible herewith.

A second group of security features that the fibers of the invention possess is the number, location, composition and physical properties of components. Bi-component fibers are known having two distinct cross-sectional domains of two distinct polymer types differing from each other in composition (e.g., polyester vs. nylon) or in physical properties (e.g., color). Bi-component fibers and methods for their manufacture are described for example in U.S. Pat. Nos. 4,552,603, 4,601,949, and 6,158,204. The disclosures of these patents are hereby incorporated by reference to the extent not incompatible herewith. The components may be in a side-by-side relationship or in a sheath-core relationship.

In one embodiment, the number of components in the security fibers of the invention is at least two. It is preferred that the components in a multi-component fiber be in a side-by-side relationship with one another. FIG. 7 illustrates the cross-section of one bi-component fiber described in U.S. Pat. No. 6,158,204. The portions of the cross-sections labeled A and B represent different components.

The components may be of different polymer compositions. However, it is preferred that the components are comprised of the same basic polymer but have different colors under normal lighting conditions and different luminescent responses to UV or IR illumination. The polymer constituents of the security fibers of the invention are selected from the group consisting of polyamides, polyesters, polyolefins, polyacrylics, polyalcohols, polyethers, polyketones, polycarbonates, polysulfides, polyurethanes, and cellulosic and polyvinyl derivatives. Polyolefins, polyesters and polyamides are preferred. Most preferred polymers are polypropylene, polyethylene terephthalate, polytrimethylene terephthalate, nylon 6 and nylon 66.

The security fibers of the invention have an "effective diameter" of about 0.01 mm to about 3 mm. Effective diameter for the purposes of this invention is the diameter of the smallest circle that can circumscribe the fiber cross-section.

In one embodiment of the invention, the fibers are transversely sectioned into cross-sectional slices of 0.005 mm to 0.5 mm thickness. The resulting "dots" are incorporated into papers or other articles where the unique cross-sections, components and luminescent responses are readily identified with the naked eye or under moderate magnification.

A third security feature of the fibers of the invention is multiple luminescent responses. The luminescent responses are selected from the group consisting of phosphorescence or fluorescence. The luminescent responses include wavelengths in the infrared, the visible and the ultra-violet regions of the spectrum. The infra-red spectrum is taken to begin at wavelengths greater than 700 nanometers (nm) and for the purposes of this invention may be taken to end at 2000 nm. The visible spectrum is taken to lie in the wavelength region of 400 to 700 nm. The ultraviolet spectrum is taken to lie in the region 200 to 400 nm.

Luminescent substances are incorporated in one or more of the components of the security fibers of the invention. A single luminescent substance may have multiple luminescent responses as indicated by multiple intensity peaks in its luminescent spectrum. For the purposes of this invention, spectral peaks having an intensity less than about one-fifth of the maximum peak intensity shall be disregarded.

In one embodiment, the security fiber has one component and this component contains one or more luminescent substances presenting differing luminescent responses to illuminations of the same or differing wavelengths. In another embodiment, the security fibers are multi-component fibers each containing a single luminescent substance but with differing luminescent responses to the same or differing wavelengths. In yet another embodiment, the security fibers are multi-component fibers each containing multiple luminescent substances with differing luminescent responses to illuminations of the same or differing wavelengths.

Luminescence of the security fibers of the invention is obtained by incorporation of luminescent copolymers, pigments or dyes prior to or during spinning, or by dyeing of the spun fiber with luminescent dyes. It is preferred that luminescent copolymers, pigments or dyes are integrally incorporated into the fiber by mixing prior to or during the fiber spinning operation. It is most preferred that the luminescent substances be incorporated by mixing with the polymer in a mixer, followed by extrusion and spinning using a twin screw extruder having mixing elements.

The multiple luminescent responses are in one or more of the infra-red, visible and ultraviolet regions of the spectrum. Preferably, the peak intensities of the multiple luminescent responses of the security fibers of the invention are separated in wavelength by at least 20 nm, more preferably by at least 50 nm, and yet more preferably by at least 100 nm. It is most preferred that the multiple luminescent responses have peak wavelengths in at least two different regions of the spectrum. Most preferably, the multiple luminescent responses are in the infra-red and visible regions of the spectrum.

The multiple luminescent responses of the security fibers of the invention are excited by one or more illumination wavelengths selected from the infra-red, the visible and the ultraviolet regions of the spectrum. Preferably, the luminescent responses are excited by one or more wavelengths in the infra-red and the ultraviolet.

Luminescent pigments or dyes may be organic or inorganic substances. Examples of thermally stable organic substances useful in the security fibers of the invention are the compounds 4,4'-bis(2 methoxystyryl)-1,1'-biphenyl, 4,4'-bis(benzoaxazol-2-yl)stilbene, and 2,5-thiophenediylbis (5-tert-butyl-1,3-benzoxazole). These compounds are sold commercially by Ciba Specialty Chemicals Inc. under the trade names UVITEX® FP, UVITEX® OB-ONE, and UVITEX® OB respectively. They are excited by ultraviolet radiation and fluoresce in the ultraviolet and visible regions of the spectrum.

Figure 8:
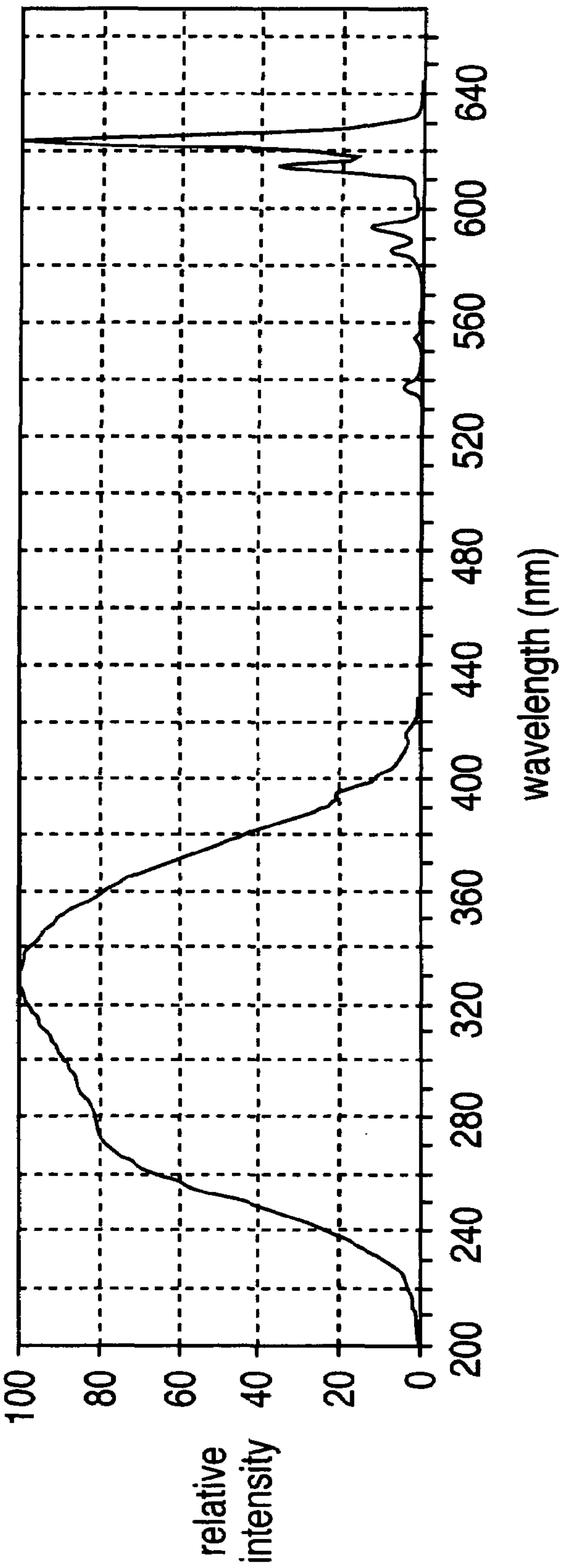
FIG. 8 shows the excitation and fluorescence spectra of an inorganic luminescent pigment $La_2O_2S$:Eu available commercially as LUMILUX® Red CD 168.
Figure 9:
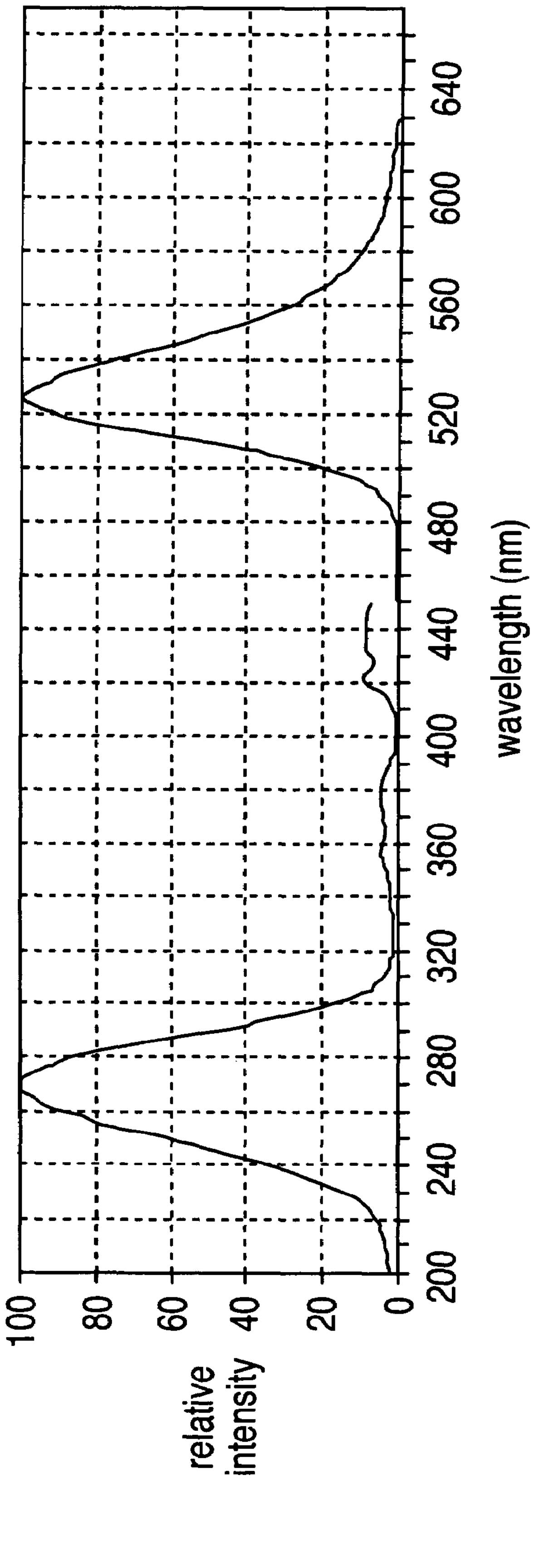
FIG. 9 shows the excitation and fluorescence spectra of $ZnSiO_4$:Mn, available commercially from Honeywell International Inc. as LUMILUX® Green CD 145.
Figure 10:
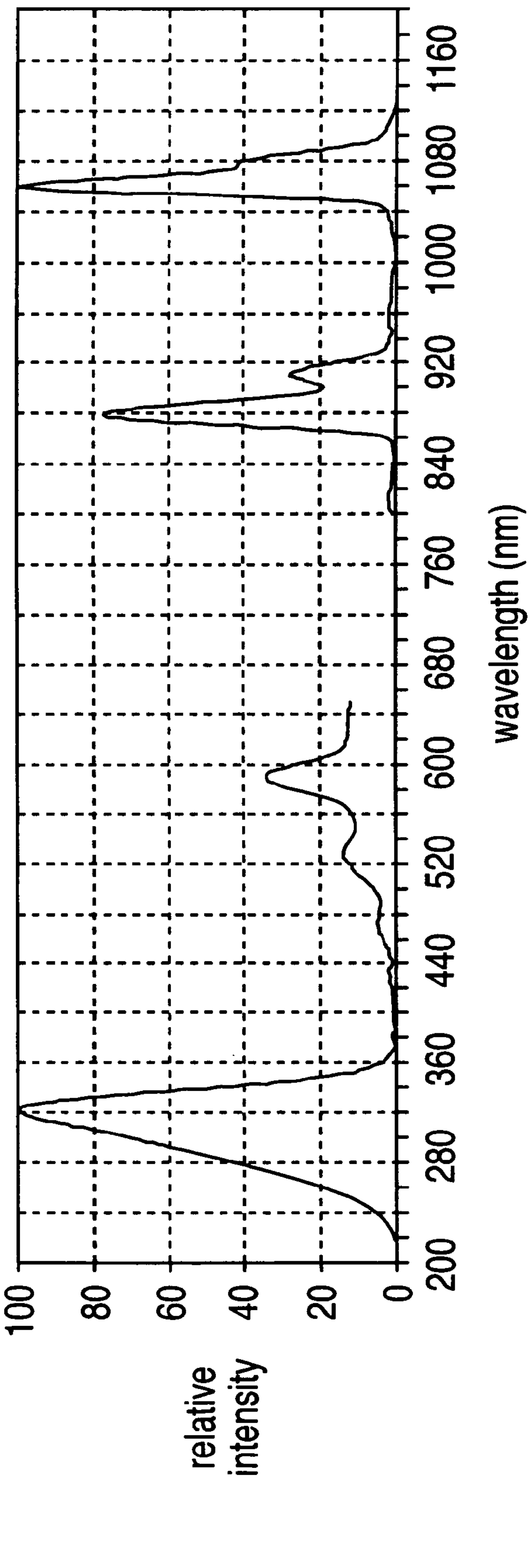
FIG. 10 shows the excitation and fluorescence spectra of $YVO_4$:Nd, available commercially from Honeywell International Inc. as LUMILUX® IR-DC 139.

Examples of inorganic substances useful in the security fibers of the invention are the materials $La_2O_2S$:Eu, $ZnSiO_4$:Mn, and $YVO_4$:Nd. These materials are sold commercially by Honeywell Specialty Chemicals under the trade names LUMILUX® Red CD 168, LUMILUX® Green CD 145 and LUMILUX® IR-DC 139, respectively. FIGS. 8–10 show their excitation and fluorescence spectra. Each is excited by ultraviolet radiation. LUMILUX® Red CD 168 and LUMILUX® Green CD 145 fluoresce in the visible. LUMILUXE® IR-DC 139 fluoresces in the infra-red.

Figure 11:
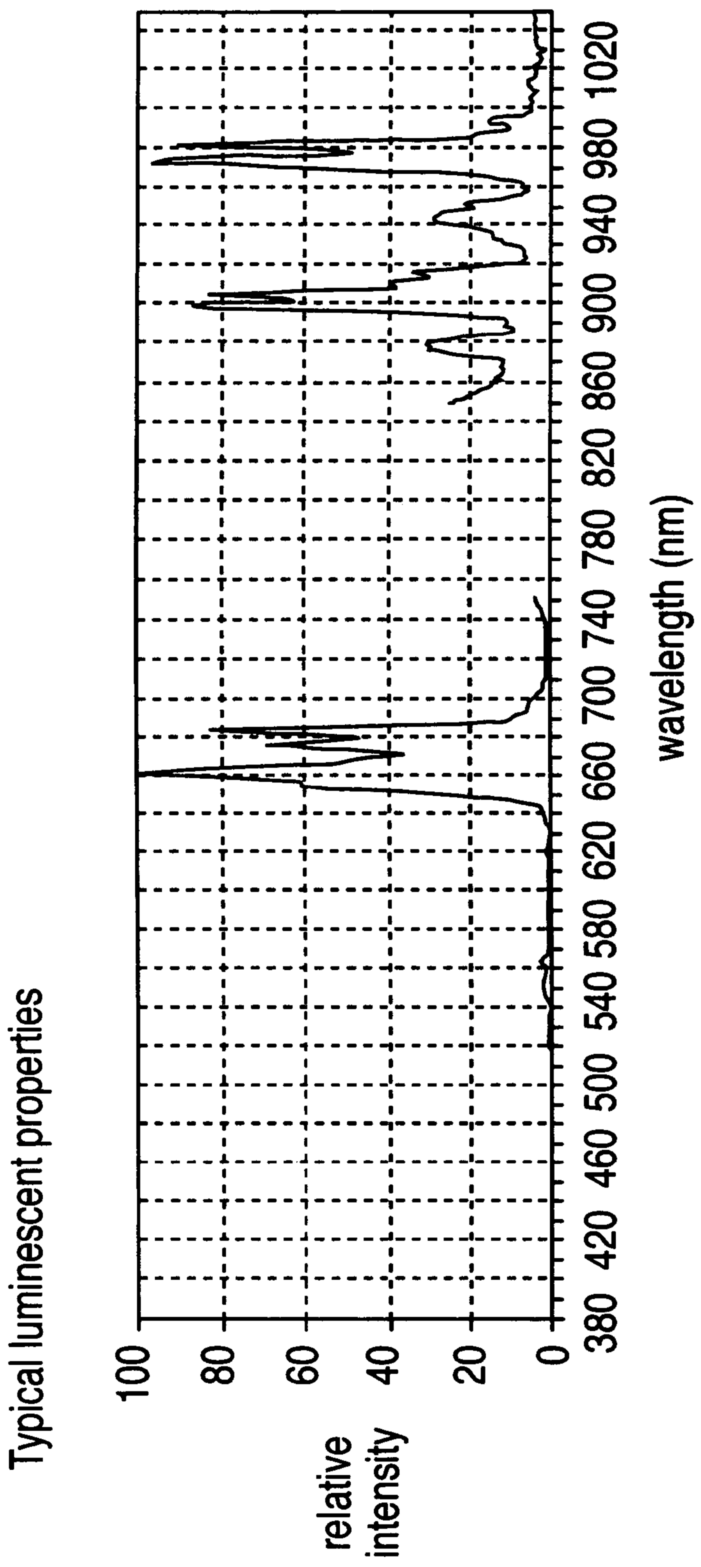
FIG. 11 shows the excitation and fluorescence spectra of a rare earth oxysulfide, available commercially from Honeywell International Inc. as LUMILUX® Red UC 6.

Another substance useful in the security fibers of the invention is a rare earth oxysulfide sold commercially by Honeywell Specialty Chemicals under the trade name LUMILUX® Red UC 6. This material is excited by infra-red and fluoresces in the visible. Its excitation and fluorescence spectra are shown in FIG. 11.

Examples of luminescent copolymers useful in the security fibers of the invention are described in U.S. Pat. Nos. 3,668,189 and 5,292,855 and 5,461,136. Described are thermally stable co-polyamides, co-polyesters and co-polyester-amides having fluorophoric compounds copolymerized therein. The copolymers of U.S. Pat. No. 5,292,855 are excited by and fluoresce at wavelengths in the near infra-red region of the spectrum.

U.S. Pat. Nos. 5,424,006 and 5,674,437 describe phosphorescent substances and methods of their manufacture useful in the security fibers of the invention. Fluorescent substances cease fluorescing virtually instantaneously, in less than about a thousandth of a second, upon cessation of excitation. Phosphorescent substances may continue luminous emissions for some tens or hundreds of minutes after cessation of excitation. An example is the material $SrAl_2O_4$: Eu Dy described in U.S. Pat. No. 5,424,006. The rate of decay of luminescence is one of the verifiable features of the fibers of the invention.

The security fibers of the invention are formed into security threads by conventional fiber processes such as twisting, cabling, braiding, texturizing and heat setting. The same or different security fibers may be incorporated in a security thread.

The security article of the invention can be security threads or other items, such as passports, currency, or other important documents. The threads can be used to reproduce luminescent logos in fabrics or clothing, or may include such a logo as a complex cross-section. A cabled security thread can be tailored to specific end uses through any combination of colors and cross-sections. By way of example, a security thread could have a star cross-section (FIG. 1) with a red luminescent response. Such a security thread could be targeted for the Chinese passport since the national color of Chinese flag is red and its flag has five stars. For Italy, the security thread could be a combination of security fibers having red and green luminescent responses with a white fiber, to target the national colors of the Italian flag.

The following examples are presented to provide a more complete understanding of the invention. The specific techniques, conditions, materials, proportions and reported data set forth to illustrate the principles of the invention are exemplary and should not be construed as limiting the scope of the invention.

In the accompanying examples the formic acid viscosity (FAV) is determined via ASTM-D789-97, with the following changes. A Cannon-Fenske viscometer, otherwise called a modified Ostwald viscometer, was utilized in lieu of the calibrated pipet-type viscometer specified. 5.50 g per 50.0 mL of 90% formic acid was utilized in lieu of the specified quantity of 11.00 g per 100 mL of 90% formic acid.

EXAMPLE 1

Honeywell International Inc. nylon 6 (grade MBM, 55 FAV) is tumble blended in a twin shell dry mixer with 2.5 wt. % of an inorganic luminescent pigment $La_2O_2S$:Eu, and 2.5 wt. % of second inorganic luminescent pigment $YVO_4$:Nd. The pigments are manufactured by Honeywell Specialty Chemicals and designated LUMILUX® Red CD 168 and LUMILUX IR-CD 139 respectively. 95 wt. % of the $La_2O_2S$:Eu (LUMILUX® Red CD 168) pigment is of particle size less than 8.0 micrometers. 95 wt. % of the $YVO_4$:Nd (LUMILUX® IR-CD 139) pigment is of particle size less than 11.0 micrometers.

The blended mixture is fed to a Leistritz twin screw extruder of 18 mm diameter and 40:1 L/D. The extruder screws have mixing and kneading elements as well as conveying elements. The extruder barrel zone temperatures are set at 250–255° C. The polymer melt is delivered to a Zenith gear pump and then passed through a graded screen pack consisting of 17 screens ranging from 20 mesh down to 325 mesh (44 micrometer opening). After passing through the screen pack, the polymer melt issues from a 14 hole spinneret to produce the filament cross-section shown in FIG. 1. The issuing melt filaments are solidified by co-current quench air flow at 19.5° C. The extrusion rate is 9.46 g/min and the initial fiber take-up speed is 500 meters/min. The fiber is drawn 2.8:1 in-line with spinning. Final fiber dimensional and tensile properties (measured by ASTM D2256) are as follows:

| | |
|---|---|
| Denier/filament: | 4.3 |
| Effective Diameter | 0.12 mm |
| Tenacity: | 3.9 g/d |
| Initial Modulus: | 49 g/d |
| Ultimate Elongation | 16% |

The filaments of this example have the complex cross-section shown in FIG. 1 (complexity factor of 7), one component, and when illuminated by a mercury UV lamp, has multiple fluorescent responses with peaks at 622 nanometers (red) and at 880 and 1060 nanometers in the infra-red. The filaments are essentially colorless under normal illumination.

EXAMPLE 2

Example 1 was repeated with the following changes: BHS grade, 90 FAV nylon 6 polymer with 5% Lumilux® red CD 740; extruder barrel zone temperature at 310° C.; and filament cross-section as shown in FIG. 2A. A first fiber (Example 2X) was drawn offline at a draw ratio of 3.6:1. A second fiber (Example 2Y) was drawn offline at a draw ratio of 5.6:1. Final fiber dimensional and tensile properties (measured by ASTM D2256) are as follows:

| Example | 2X | 2Y |
|---|---|---|
| Denier/filament: | 22 | 15 |
| Tenacity: | 3.3–3.6 g/d | 5.4–5.8 g/d |
| Initial Modulus: | 19–22 g/d | 28 g/d |
| Ultimate Elongation | 62% | 15–19% |

The filaments of this example have the complex cross-section shown in FIG. 2A, and when illuminated by a mercury UV lamp, have a visible red color The filaments are essentially colorless under normal illumination.

EXAMPLE 3

The fibers of Example 1 are transversely sectioned at intervals of 0.2 mm to produce "dots" having the complexity factor and multiple fluorescent responses as in Example 1.

EXAMPLE 4

Honeywell International Inc. nylon 6 (Grade MBM, 55 FAV) is tumble blended in a twin shell dry mixer with 5.0 wt. % of an inorganic luminescent pigment $La_2O_2S$:Eu (LUMI- LUX® Red CD 168). A second batch of the same nylon 6 is tumble blended with 5.0 wt. % of a different inorganic luminescent pigment $ZnSiO_4$:Mn designated LUMILUX® Green CD 145. 95 wt. % of the $ZnSiO_4$:Mn (LUMILUX® Green CD 145) pigment is of particle size less than 7.0 micrometers.

Each of the blended mixtures is fed to a twin screw extruder with barrel zone temperatures at 250–255° C. The separate polymer melts are conveyed through separate Zenith gear pumps and screen packs, and into a common spin block. The melt streams are combined as described in U.S. Pat. No. 6,158,204 to produce a bi-component fiber having the filament cross-section illustrated in FIG. 7. Fourteen filaments are spun at the same combined extrusion rate and the same take-up speed as in Example 1. The fiber is drawn 2.8:1 in-line. Final fiber dimensional and tensile properties (measured by ASTM D2256) are the following:

| | |
|---|---|
| Denier/filament: | 4.3 |
| Effective Diameter | 0.042 mm |
| Tenacity: | 4.1 g/d |
| Initial Modulus: | 40 g/d |
| Ultimate Elongation | 20% |

The filaments of the invention have the complex cross-section shown in FIG. 7 (complexity factor of 39), two components, and when illuminated by a mercury UV lamp, show side-by-side fluorescent responses with peaks at 622 nanometers (red) in one component and at 525 nanometers (green) in the other component. The filaments are essentially colorless under normal illumination.

EXAMPLE 5

The fibers of Example 4 are transversely sectioned at intervals of 0.2 mm to produce "dots" having the complexity factor and multiple fluorescent responses as in Example 4.

EXAMPLE 6

A bi-component fiber having the complex cross-section shown in FIG. 7 is prepared as in Example 4 with the exception that one component contains 5.0 wt. % of $La_2O_2S$:Eu (LUMILUX® Red CD 168) pigment. The second component contains 2.5 wt. % of $YVO_4$:Nd (LUMILUX® IR-CD 139) pigment and 2.5 wt. % $ZnSiO_4$:Mn (LUMILUX® Green CD 145) pigment. The filaments of the invention have the complex cross-section shown in FIG. 7 (complexity factor of 39), two components, and when illuminated by a mercury UV lamp, show side-by-side fluorescent responses with peaks at 622 nanometers (red) in one component and at 525 nanometers (green) in the second component. Furthermore, the second component also fluoresces in the infra-red at 880 and 1060 nanometers. The filaments are essentially colorless under normal illumination.

EXAMPLE 7

A bi-component fiber having the complex cross-section shown in FIG. 7 is prepared as in Example 4 with the exception that one component contains 5.0 wt. % of $La_2O_2S$:Eu (LUMILUX® Red CD 168) pigment. The second component contains 5.0 wt. % of $CaAl_2O_4$:Eu,Sm phosphorescent phosphor prepared as in U.S. Pat. No. 5,424,006, hereby incorporated by reference to the extent not inconsistent herewith. The filaments of the invention have the complex cross-section shown in FIG. 7 (complexity factor of 39), two components, and when illuminated by a mercury UV lamp, show side-by-side fluorescent responses with peaks at 622 nanometers (red) in one component and at 450 nanometers (blue) in the second component. Furthermore, the second component continues to glow with a blue phosphorescence for tens of minutes after the cessation of illumination. The filaments are essentially colorless under normal illumination.

EXAMPLE 8

Honeywell International Inc. nylon 6 (Grade MBM, 55 FAV) is tumble blended in a twin shell dry mixer with 5.0 wt. % of a phosphorescent phosphor $CaAl_2O_4$:Eu,Sm (see Example 7). A second batch of Honeywell International polyethylene terephthalate (PET) (0.85 intrinsic viscosity) is tumble blended in a twin shell dry mixer with 5.0 wt. % of a different inorganic luminescent pigment $La_2O_2S$:Eu (LUMILUX® Red CD 168). Each of the blended mixtures is fed to a twin screw extruder with barrel zone temperatures at 250–255° C. for the nylon 6 and 285–300° C. for the PET. The separate polymer melts are conveyed through separate Zenith gear pumps and screen packs, and into a common spin block. The melt streams are combined as described in U.S. Pat. No. 6,158,204 to produce a bi-component fiber. Fourteen filaments are spun at the same extrusion rate and take-up speed as in Example 1. The fiber is not further drawn. The final filaments are 12 denier/filament and have an effective diameter of 0.070 mm. The fiber is a bi-component fiber having the complex cross-section shown in FIG. 7. The fiber is dyed in a dye bath using an acid dye of Burconyl Yellow M-R 250% produced by Burlington Chemical Inc. Under normal illumination the nylon 6 half of the fiber is yellow but the PET half is essentially colorless. When illuminated by a mercury UV lamp, the PET portion of the fiber fluoresces in the red and the nylon 6 portion is a phophorescent green.

EXAMPLES 9–14

Other security fibers of the invention are prepared having the constructions described in Table I below.

Having thus described the invention in rather full detail, it will be understood that such detail need not be strictly adhered to but that further changes and modifications may suggest themselves to one skilled in the art, all falling within the scope of the invention as defined by the subjoined claims.

TABLE I

| Example No. | Cross-section | Components Polymer/Luminescent* | Complexity Factor | Excitation | Peak Luminescent Responses, nm | Luminescence Type |
|---|---|---|---|---|---|---|
| 9 | FIG. 2B | PET/Copolymer A | 10 | Laser diode 672 nm | 687, 755 | fluorescence |

TABLE I-continued

| Example No. | Cross-section | Components Polymer/Luminescent* | Complexity Factor | Excitation | Peak Luminescent Responses, nm | Luminescence Type |
|---|---|---|---|---|---|---|
| 10 | FIG. 3 | N6/$Zn_2SiO_4$:Mn; $YVO_4$:Nd | 15 | mercury lamp UV | 525, 860, 1060 | fluorescence |
| 11 | FIG. 4 | N6/$Zn_2SiO_4$:Mn; $YVO_4$:Nd | 135 | Mercury lamp UV | 525, 860, 1060 | fluorescence |
| 12 | FIG. 5 | PP/LUMILUX Red UC 6; $YVO_4$: Nd | 30 | IR laser diode 980 nm; mercury lamp UV | 660, 680 860, 1060 | fluorescence |
| 13 | FIG. 6 | N66/$CaAl_2O_4$:Eu,Sm; $La_2O_2S$:Eu | 70 | mercury lamp UV | 450, 622 | phosphorescence, fluorescence |
| 14 | FIG. 7 | 1. TMT/Copolymer A 2. TMT/$CaAl_2O_4$:Eu,Sm | 39 | Laser diode 672 nm mercury lamp UV | 1. 687, 755 2. 450 | 1. fluorescence 2. phosphorescence |

Copolymer A = Example 16 of U.S. Pat. No. 5,461,136
PET = polyethylene terephthalate
N6 = polycaprolactam (nylon 6)
N66 = polyhexamethylene adipate (nylon 66)
PP = polypropylene
TMT = polytrimethylene terephthalate

What is claimed is:

1. A security fiber comprising at least one synthetic polymer filament possessing multiple security elements comprising:

a. a filament cross-section having a complexity factor of at least 5; and b. at least one said filament comprising at least one luminescent substance dispersed therein;

wherein said fiber exhibits at least two luminescent spectral response peaks when excited by at least one wavelength selected from the region 200 to 2000 nanometers.

2. The security fiber of claim 1 wherein the filament cross-section has a complexity factor of at least 10.

3. The security fiber of claim 1 wherein the filament cross-section has a complexity factor of at least 15.

4. The security fiber of claim 1 wherein the filament cross-section has a complexity factor of at least 20.

5. The security fiber of claim 1 wherein the filament cross-section has a complexity factor of at least 25.

6. The security fiber of claim 1 wherein the filament cross-section is a member selected from the group illustrated in FIGS. 1, 2, 3, 4, 5, 6 and 7.

7. The security fiber of claim 1 wherein the number of said filaments is at least two.

8. The security fiber of claim 7 wherein said filaments are in a side-by-side relationship.

9. The security fiber of claim 7 wherein said filaments comprise the same polymer containing different luminescent substances.

10. The security fiber of claim 1 wherein the wavelength producing a luminescent response is in the infra-red.

11. The security fiber of claim 1 wherein the wavelength producing a luminescent response is in the visible.

12. The security fiber of claim 1 wherein the wavelength producing a luminescent response is in the ultraviolet.

13. The security fiber of claim 1 where at least one of the luminescent responses is in the visible and at least one luminescent response is in the infra-red.

14. The security fiber of claim 1 wherein there are two or more excitation wavelengths producing luminescent responses and wherein the excitation wavelengths lie within at least two different members of group consisting of the infra-red, the visible and the ultraviolet.

15. The security fiber of claim 1 wherein at least one of the luminescent responses is fluorescence and at least one of the luminescent responses is phosphorescence.

16. The security fiber of claim 1 wherein the effective diameter of the filament(s) is in the range of 0.01 to 3 mm.

17. The security fiber of claim 1 prepared by the process comprising:

a. mixing a polymer and a luminescent substance in a mixer in a dry state;

b. extruding and spinning the mixture using a twin screw extruder with mixing and kneading elements; and c. cooling the melt filaments to solidify.

18. A security article containing the security fiber of claim 1.

19. A security thread comprising a plurality of the fibers of claim 1.

20. The security thread of claim 19 comprising at least one other fiber.

21. A security article containing the security thread of claim 19.

22. The security fiber of claim 1 wherein said fiber comprises different luminescent substances.

23. The security fiber of claim 1 herein said fiber comprises a single luminescent substance.

24. A security fiber comprising at least one synthetic polymer filament possessing multiple security elements comprising:

a. a filament cross-section having a complexity factor of at least 5; and b. at least one said filament comprising at least one luminescent substance dispersed therein;

wherein said fiber exhibits at least one luminescent spectral response peak when excited by at least one wavelength selected from the region 200 to 2000 nanometers.

25. The security fiber of claim 24 wherein the filament cross-section has a complexity factor selected from the group consisting of at least 10, at least 15, at least 20 and at least 25.

26. The security fiber of claim 24 wherein the filament cross-section is a member selected from the group illustrated in FIGS. 1,2,3,4,5,6 and 7.

27. The security fiber of claim 24 wherein the number of said filaments is at least two.

28. The security fiber of claim 27 wherein said filaments are in a side-by-side relationship.

29. The security fiber of claim 27 wherein said filaments comprise the same polymer containing different luminescent substances.

30. The security fiber of claim 24 wherein the wavelength producing a luminescent response is selected from the group consisting of the infra-red, the visible and the ultraviolet regions of the spectrum.

31. The security fiber of claim 24 wherein the effective diameter of the filament(s) is in the range of 0.01 to 3 mm.

32. The security fiber of claim 24 prepared by the process comprising:

a. mixing a polymer and a luminescent substance in a mixer in a dry state;

b. extruding and spinning the mixture using a twin screw extruder with mixing and kneading elements thereby forming melt filaments; and c. cooling the melt filaments to solidify.

33. An article containing the security fiber of claim 24.

34. A security thread comprising a plurality of the fibers of claim 24.

35. The security thread of claim 34 comprising at least one other fiber.

36. A security article containing the security thread of claim 34.

37. A method of protecting documents or articles against fraudulent duplication by incorporating therein security fiber comprising at least one synthetic polymer filament possessing multiple security elements comprising:

a. a filament cross-section having a complexity factor of at least 5; and b. at least one said filament comprising at least one luminescent substance dispersed therein;

wherein said luminescent substance exhibits at least one luminescent spectral response peak when excited by at least one wavelength selected from the region 200 to 2000 nanometers.

38. A method of making security fiber comprising at least one synthetic polymer filament and possessing multiple security elements, said fiber comprising:

a. a filament cross-section having a complexity factor of at least 5; and b. at least one said filament comprising at least one luminescent substance dispersed therein;

wherein said luminescent substance exhibits at least one luminescent spectral response peaks when excited by at least one wavelength selected from the region 200 to 2000 nanometers, prepared by the process comprising:

a. mixing a polymer and a luminescent substance in a mixer;

b. extruding and spinning the mixture using a twin screw extruder having mixing and kneading elements to produce melt filaments; and c. cooling the melt filaments to solidify.

* * * * *